(12) United States Patent
No et al.

(10) Patent No.: US 8,741,430 B2
(45) Date of Patent: Jun. 3, 2014

(54) STORAGE STABLE AMINO-FORMALDEHYDE RESINS AND APPLICATIONS THEREOF

(75) Inventors: Byung Young No, Eugene, OR (US); David M. Harmon, Eugene, OR (US); Todd R. Miller, Eugene, OR (US)

(73) Assignee: Momentive Specialty Chemicals Inc., Columbus, OH (US)

( * ) Notice: Subject to any disclaimer, the term of this patent is extended or adjusted under 35 U.S.C. 154(b) by 454 days.

(21) Appl. No.: 12/145,667

(22) Filed: Jun. 25, 2008

(65) Prior Publication Data

US 2009/0326166 A1    Dec. 31, 2009

(51) Int. Cl.
| C08L 61/24 | (2006.01) |
| C08L 61/28 | (2006.01) |
| C08L 61/32 | (2006.01) |
| C08G 12/12 | (2006.01) |
| C08G 12/32 | (2006.01) |

(52) U.S. Cl.
USPC ........... 428/393; 528/256; 528/254; 528/259; 528/263

(58) Field of Classification Search
USPC ............... 528/256, 254, 259, 263; 428/393
See application file for complete search history.

(56) References Cited

U.S. PATENT DOCUMENTS

| 2,294,873 A * | 9/1942 | D Alelio ................. 528/256 |
| 2,856,314 A | 10/1958 | Wooding et al. |
| 3,351,615 A | 11/1967 | Gordon et al. |
| 3,883,462 A | 5/1975 | Pearson |
| 3,979,341 A | 9/1976 | Widmann |
| 4,076,896 A | 2/1978 | Bunkowski |
| 4,183,832 A * | 1/1980 | Meunier et al. ............. 523/344 |
| 4,225,680 A | 9/1980 | Williams |
| 4,429,075 A | 1/1984 | Carlson |
| 4,457,978 A | 7/1984 | Wawzonek |
| 4,482,699 A | 11/1984 | Williams |
| 4,499,200 A | 2/1985 | Carlson |
| 4,536,245 A | 8/1985 | Shiau et al. |
| 4,761,184 A * | 8/1988 | Markessini ................. 106/217.6 |
| 4,997,905 A | 3/1991 | Druet et al. |
| 5,125,952 A | 6/1992 | Moore et al. |
| 5,162,462 A | 11/1992 | Barthomieux et al. |
| 5,681,917 A * | 10/1997 | Breyer et al. ................. 528/256 |
| 5,684,118 A | 11/1997 | Breyer et al. |
| 5,710,239 A | 1/1998 | Tutin |
| 6,369,171 B2 | 4/2002 | Dupre et al. |
| 6,548,625 B2 | 4/2003 | Zhu et al. |
| 6,566,459 B1 | 5/2003 | Dopico et al. |
| 2003/0096922 A1 | 5/2003 | Tutin et al. |
| 2005/0222286 A1 | 10/2005 | Gilder et al. |
| 2009/0326185 A1 | 12/2009 | No et al. |
| 2011/0143120 A1 | 6/2011 | Slayter et al. |

FOREIGN PATENT DOCUMENTS

JP    57121017 A  *  7/1982

OTHER PUBLICATIONS

Sigma Aldrich catalog, urea, web screen shot, Sep. 29, 2009.*
Tohmura et al., "Influence of the Melamine Content in Melamine-Urea-Formaldehyde Resins on Formaldehyde Emission and Ured Resin Structure" J. Wood Sci (2001) 47:451-457.

* cited by examiner

Primary Examiner — Randy Gulakowski
Assistant Examiner — Rachel Kahn

(57) ABSTRACT

Amino-formaldehyde resins may be prepared using formulations including formaldehyde, glycerin and at least one amino compound selected from the group consisting of urea, melamine, and mixtures thereof; under reaction conditions sufficient to prepare a resin, wherein; the amino-formaldehyde resin is prepared in a substantial absence of a sulfonating agent, ethylene glycol, and polyalkylene glycols. If the amino compound is urea, then the urea is present in a molar ratio of formaldehyde to urea ranging from 0.70 to 1.30; if the amino compound is melamine, then the melamine is present in a molar ratio of formaldehyde to melamine ranging from 1.3 to 2.2; and if the amino compound is a mixture of urea and melamine, then the mixture of urea and melamine is present in a molar ratio of formaldehyde to urea and melamine ranging from 0.35 to 1.3.

16 Claims, No Drawings

STORAGE STABLE AMINO-FORMALDEHYDE RESINS AND APPLICATIONS THEREOF

BACKGROUND OF THE INVENTION

1. Field of the Invention

The present invention relates to amino-formaldehyde resins that are storage stable and applications thereof. The present invention particularly relates to storage stable urea formaldehyde resins, melamine formaldehyde resins, and melamine urea formaldehyde resins that are storage stable and applications thereof.

2. Background of the Art

Formaldehyde is one of the most common chemicals used in industry. International production was over 46 billion pounds in 2004, according to the International Agency for Research on Cancer (IARC). It is well known as a preservative in medical laboratories, as an embalming fluid, and as a sterilizer. Formaldehyde's primary use is in the production of resins and as a chemical intermediate. Urea-formaldehyde and phenol formaldehyde resins are used in foam insulations, as adhesives in the production of particleboard and plywood, and in the treating of textiles.

Unfortunately, formaldehyde is considered undesirable in many applications. For example, the United States Occupational Safety and Health Administration, on its website, classifies formaldehyde as "reasonably anticipated to be a human carcinogen." Recently, the Associated Press reported that after resisting for years, the Federal Emergency Management Agency is setting strict new limits on formaldehyde levels in the mobile homes it buys for disaster victims to limit exposure of disaster victims to unhealthy levels of formaldehyde.

Responding to safety concerns, the agency said that it will take "extraordinary precautions" by buying trailers with formaldehyde emissions comparable to that of conventional housing. The requirement will start with a new three-year contract to purchase up to 3,300 units and a smaller contract for units intended for disabled residents.

It would be desirable in the art of making amino-formaldehyde resins to decrease the amount of formaldehyde released over time by the resins. It would also be desirable in the art if those resins were storage stable over time.

SUMMARY OF THE INVENTION

In one aspect, the invention is an amino-formaldehyde resin prepared using a formulation comprising formaldehyde, glycerin and at least one compound selected from the group consisting of urea, melamine, and mixtures thereof; wherein; the amino-formaldehyde resin is prepared in a substantial absence of a sulfonating agent, ethylene glycol, and polyalkylene glycols; if the at least one compound is urea, then the urea is present in a molar ratio of formaldehyde to urea ranging from 0.70, to 1.30; if at least one compound is melamine, then the melamine is present in a molar ratio of formaldehyde to melamine ranging from 1.3 to 2.2; and if the at least one compound is a mixture of urea and melamine, then the mixture of urea and melamine is present in a molar ratio of formaldehyde to urea and melamine ranging from 0.35 to 1.3.

In another aspect, the invention is a process for preparing an amino-formaldehyde resin comprising preparing the amino-formaldehyde resin using a formulation comprising formaldehyde, glycerin and at least one compound selected from the group consisting of urea, melamine, and mixtures thereof; wherein; the amino-formaldehyde resin is prepared in a substantial absence of a sulfonating agent, ethylene glycol, and polyalkylene glycols; if the at least one compound is urea, then the urea is present in a molar ratio of formaldehyde to urea ranging from 0.70 to 1.30; if the at least one compound is melamine, then the melamine is present in a molar ratio of formaldehyde to melamine ranging from 1.3 to 2.2; and if the at least one compound is a mixture of urea and melamine, then the mixture of urea and melamine is present in a molar ratio of formaldehyde to urea and melamine ranging from 0.35 to 1.3.

In still another aspect, the invention is an article of manufacture comprising a substrate and an amino-formaldehyde resin wherein: the substrate is in a form selected from the group consisting of cellulosic-particles, -strands, -fibers, -veneers, and mixtures thereof; the amino-formaldehyde resin functions to adhere the substrate together into the article of manufacture; and the amino-formaldehyde resin is prepared using a formulation comprising formaldehyde, glycerin and at least one compound selected from the group consisting of urea, melamine, and mixtures thereof; under reaction conditions sufficient to prepare a resin, wherein; the amino-formaldehyde resin is prepared in a substantial absence of a sulfonating agent, ethylene glycol, and polyalkylene glycols; if the at least one compound is urea, then the urea is present in a molar ratio of formaldehyde to urea ranging from 0.70 to 1.30; if the at least one compound is melamine, then the melamine is present in a molar ratio of formaldehyde to melamine ranging from 1.3 to 2.2; and if the at least one compound is a mixture of urea and melamine, then the mixture of urea and melamine is present in a molar ratio of formaldehyde to urea and melamine ranging from 0.35 to 1.3

DESCRIPTION OF THE PREFERRED EMBODIMENTS

One embodiment of the invention is an amino-formaldehyde resin comprising the product of admixing formaldehyde, glycerin and at least one compound selected from the group consisting of urea, melamine, and mixtures thereof; under reaction conditions sufficient to prepare an amino-formaldehyde resin. For the purposes of the disclosure an amino-formaldehyde resin is one prepared with formaldehyde and urea or melamine or urea and melamine. The urea formaldehyde resins are often referred to in the art as UF resins. The melamine urea formaldehyde resins are often referred to in the art as MUF resins. The melamine formaldehyde resins are commonly referred to in the art as MF resins.

The amino-formaldehyde resins of the disclosure are modified using glycerin. Glycerin, sometimes spelled glycerine, and also sometimes referred to as glycerol ($C_3H_5(OH)_3$) is commonly available in many grades. For example, it can be purchased as food or pharmaceutical grade. In the alternative, it may also be purchased as a technical grade. In most embodiments, the glycerin used with the invention may have a glycerol concentration of from about 70 to about 99.5 percent.

In some embodiments, the amino-formaldehyde resins of the disclosure may be prepared using formalin which is, for the purposes of this disclosure, formaldehyde dissolved in water. While any concentration of formaldehyde known to be useful to those skilled in the art of preparing resins to be useful may be used in the formalin, a weight concentration of from about 44 to about 55 percent may be used because of its wide availability. In one embodiment, the formalin will have a concentration of about 35 weight percent. In another embodiment, the formalin will have a concentration of about 50 weight percent.

In other embodiments, the amino-formaldehyde resins of the disclosure that include urea may be prepared using formaldehyde in the form of a urea formaldehyde concentrate. This concentrate may include, for example, about 60% formaldehyde and about 25% urea. When higher concentrations of formaldehyde are used, it may be desirable to insure that the formation of paraformaldehyde is avoided.

Some of the embodiments of the amino-formaldehyde resins of the disclosure are prepared using melamine. The melamine grade may be any that is known to be useful to those of ordinary skill in the art of preparing amino-formaldehyde resins. For example, the melamine used with some embodiments of the invention may have a purity of about 99 percent. In some embodiments, the melamine may have a particle size small enough to ensure quick and complete dissolution. For example, in one such embodiment, the melamine may have a particle size of from about 50 to 400 microns.

The amino-formaldehyde resins of the disclosure may be made with urea in some embodiments. The urea used in resin manufacture is handled as white solid granules and the urea used with some embodiments of the invention may have a purity of about 98 percent. The urea useful with the method of the disclosure may be any that is known to be useful to those of ordinary skill in the art of preparing amino-formaldehyde resins.

The amino-formaldehyde resins of the disclosure are prepared in the substantial absence of certain materials which may have an undesirable effect upon either the amino-formaldehyde resins themselves, or in certain applications of the amino-formaldehyde resins. For example, the resins may be prepared in the substantial absence of sulfonating agents, ethylene glycol and polyalkylene glycols. An exemplary sulfonating agent may be salts of diphenyloxide sulfonate, for example. For the purposes of this disclosure, the term substantial absence means that any amount of the subject material present is at too low of a concentration to have a material effect upon the amino-formaldehyde resins and the products prepared therewith.

The amino-formaldehyde resins of the invention have lower ratios of formaldehyde to urea, melamine, and urea and melamine than similar conventional formulations. While not wishing to be bound to any particular theory, it is believed that the reduced formaldehyde ratios results in lower formaldehyde emissions from articles of manufacture prepared using the resins of the disclosure.

In conventional formulations, lowering the formaldehyde ratios is not without problems. For example, lowering the mole ratio of UF resins increases cure time and reduces the bond strength and physical properties of composite boards due to a reduction in the extent of cross-linking during curing.

As one solution to this problem it is known to prepare melamine fortified resins. MUF resins can provide improved cross-linking and lower formaldehyde emissions at lower formaldehyde ratios [F:(U+M)] without hindering mechanical and physical properties of boards. This solution is not itself without problems. Conventional low formaldehyde formulations of MUF resins, and UF resins also, have significantly reduced storage stability compared to conventional formulations. Additionally, lower formaldehyde ratio MUF resins tend to exhibit particularly low usable storage life as the melamine level is increased.

Melamine formaldehyde resins have conventionally been formulated at relatively high formaldehyde to melamine mole ratios [F:M] with reasonable storage stability, hydrolytic stability and cross-link capability. One drawback of conventional MF resins is that conventional formulations typically exhibit relatively poor water tolerance and quickly lose flow and penetration characteristics.

Generally speaking, for conventional amino-formaldehyde resins, of all these types: UF, MUF and MF, the poor stability of low mole ratio resins results in significant viscosity gain that adversely affects resin distribution and results in decreased physical properties, unless resin dosage is dramatically increased. Increasing resin dosage it usually undesirable as this practice may increase costs to fabricators and the increased amounts of resins in products may offset or at least mitigate reductions in formaldehyde emissions.

The glycerin modified amino-formaldehyde resins of the disclosure avoid or at least mitigate these problems. The glycerin modified amino-formaldehyde resins have significantly improved storage stability as compared to otherwise conventional formulations. The products prepared using these resins have improved physical and mechanical properties as compared to products prepared using otherwise conventional formulations.

In the practice of the method of the invention, a formulation including glycerin is used to prepare an amino-formaldehyde resin. The process, in some embodiments, may include two or more stages, a stage being defined a step during which at least one of formaldehyde, urea, and/or melamine is added to a reactor to prepare a resin. In some embodiments, the glycerin may be included in the first stage, also called a front end addition, and carried through the process. In other embodiments, the glycerin may be added in at least two parts. One such addition is one where the glycerin is added in both a first and a second or other subsequent stage. This is known as a split addition. In other embodiments, the glycerin may be added in a second or subsequent stage only and this is known as a back-end addition.

It should be noted that there may be two types of molar ratios described in this disclosure; "cook" and "final." The cook molar ratio is the ratio of formaldehyde to amino compounds that is present during a condensation step. Typically, these reactants are, subject to stoichiometric limits, substantially all incorporated into a polymer. The final ratio includes both the reactants that were present during the condensation and any amino compounds that may have been added after the condensation. While these later added compounds may not be immediately incorporated into a polymer backbone, they are present within the resin and may, over time, "cure" into the polymer. For the purposes of the disclosure, the term cure means to interact with other compounds within a resin to produce a solid thermoset binding material. When all of the formaldehyde and amino compounds are present during a condensation reaction, the cook and final ratios will be the same. Unless otherwise stated, the ratios referenced in this application are "final" ratios. Exemplary processes of the disclosure for each type of amino-formaldehyde resin follow. These exemplary processes are illustrative but are not intended to limit the scope of the disclosure.

Urea Formaldehyde Resins

In some embodiments of the invention, the amino-formaldehyde resin is prepared using urea. In these embodiments, the urea is present in the UF resin in a molar ratio of formaldehyde to urea [F:U] ranging from 0.70 to 1.30. For example, in one such embodiment, the ratio of formaldehyde is about 1.15.

The glycerin level of the formulations for the UF resins of the disclosure may be from about 2 percent to about 15 percent. For example, in one such embodiment, the glycerin level is about 4 percent. In another embodiment it may be about 6 percent.

The glycerin modified UF resins of the disclosure may be prepared using any method known to be useful to those of ordinary skill in the art subject to the caveat that such method results in improvements over conventional formulations such as those demonstrated in the examples. One such method includes the steps of:

1) Charge urea formaldehyde concentrate and water to a reactor.
2) Adjust pH to 7.7±0.5 with a base (suitable bases include, but are not limited to, sodium hydroxide, potassium hydroxide, magnesium hydroxide, calcium hydroxide, or amines, such as triethanolamine).
3) Charge additional urea and glycerin to the reactor.
4) Heat the reactor to 99-102° C. and hold for 5 minutes.
5) Adjust pH to 5.7±0.1 with an acid (suitable acids include, but not limited to, various dilute acids, such as formic acid and sulfuric acid, or acid salts, such as ammonium sulfate and ammonium chloride).
6) Condense to a target viscosity at 95-102° C.
7) Adjust pH to 7.8±0.2 with a base while cooling to 60° C.
8) Charge final urea and NaCl to reactor and hold for 10 minutes at 45° C.
9) Cool the batch to 25° C. and adjust pH to 8.0±0.1 with either a base or an acid.

Melamine Formaldehyde Resins

In some embodiments of the invention, the amino-formaldehyde resin is prepared using melamine. In these embodiments of the MF resins, the melamine is present in a molar ratio of formaldehyde to melamine [F:M] ranging from 1.3 to 2.2. For example, in one such embodiment, the ratio of formaldehyde is about 1.7.

The glycerin level of the formulations for the MF resins of the disclosure may be from about 5 percent to about 25 percent. For example, in one such embodiment, the glycerin level is about 15 percent.

The glycerin modified MF resins of the disclosure may be prepared using any method known to be useful to those of ordinary skill in the art subject to the caveat that such method results in improvements over conventional formulations such as those demonstrated in the examples. One such method includes the steps of:

1) Charge 53% formaldehyde, water, and glycerin to a reactor.
2) Adjust pH to 9.3-9.5 with a base.
3) Charge melamine.
4) Heat to 95-101° C. and run the ice-phobe test.
5) Cool to 90-95° C. when the ice-phobe is reached.
6) Condense to a target water tolerance at pH 9.3-9.5.
7) Cool to 25° C. while adjusting pH to 9.3-9.5 with either a base or an acid.

Melamine and Urea Formaldehyde Resins

In some embodiments of the invention, the amino-formaldehyde resin is prepared using melamine and urea. In these embodiments of the MUF resins, the melamine and urea are present in a molar ratio of formaldehyde to melamine and urea [F:(M+U)] ranging from 0.35 to 1.3. For example, in one such embodiment, the ratio of formaldehyde is about 0.65.

The glycerin level of the formulations for the MUF resins of the disclosure may be from about 5 percent to about 20 percent. For example, in one such embodiment, the glycerin level is about 15 percent.

The glycerin modified MUF resins of the disclosure may be prepared using any method known to be useful to those of ordinary skill in the art subject to the caveat that such method results in improvements over conventional formulations such as those demonstrated in the examples. One such method includes the steps of:

1) Charge 53% formaldehyde, water, and glycerin to a reactor.
2) Adjust pH to 7.5-7.7 with a base.
3) Charge urea and melamine.
4) Heat to 95° C. and check the ice-phobe.
5) Cool to 85° C. when the ice-phobe is reached.
6) Condense to a target water tolerance (WT).
7) Charge urea and condense further to a target WT at 75-80° C.
8) Charge urea and water while keep the batch temperature 60° C.-70° C.
9) Cool to 25° C. and adjust pH to 8.0 with either a base or an acid.

Applications

The amino-formaldehyde resins of the disclosure are particularly useful in preparing articles of manufacture where the amino-formaldehyde resins function to bind or adhere substrates together. For example, in one embodiment of the invention, the substrates may be in a form selected from the group consisting of cellulosic-particles, -strands, -fibers, -veneers, and mixtures thereof.

For example, the UF, MUF, and MF resins of the disclosure may be used as the primary binders used for interior-grade wood composite boards such as particleboard (PB), hardwood plywood (HWP), and medium density fiberboard (MDF). The articles of manufacture may be prepared using any method known to be useful to those of ordinary skill in the art. For example, particleboard may be prepared using the methods disclosed in U.S. Pat. No. 4,482,699 to Williams, the entire contents of which is incorporated herein by reference.

Further, the amino-formaldehyde resins of the disclosure may be prepared including additives useful for their final applications. For example, in one embodiment, the resins may include a mold release agent. Other additives useful with the amino-formaldehyde resins of the disclosure include buffering agents, internal catalysts, tack modifiers, flow modifiers, and fire retardants.

EXAMPLES

The following examples are provided to illustrate the present invention. The examples are not intended to limit the scope of the present invention and they should not be so interpreted. Amounts are in weight parts or weight percentages unless otherwise indicated.

Example 1

Glycerin-modified UF resins were synthesized using a three-stage cook technology using Urea-Formaldehyde Concentrate (UFC). The UFC was composed of 60% formaldehyde and 25% urea. In the resin synthesis, additional urea is added in two parts, the first urea ($U_1$) and the second urea ($U_2$). In the first stage, the UFC, water, and glycerin were charged into a reactor and a pH was adjusted to 7.7±0.5 using TEA (triethanolamine) with or without 10% formic acid. Then, the first urea was added into the reactor and a temperature was raised to 99-102° C. The urea and formaldehyde were reacted in under neutral pH at an $F:U_1$ mole ratio of about 2.4:1.0.

In the second stage, the pH was adjusted to 5.7±0.1 using 10% formic acid with or without TEA. The second stage was ended at Gardner-Holt (G-H) viscosity "M" by increasing the pH to about 7.8±0.2 with TEA.

In the third step the reaction mixture was cooled to about 60° C. and the second urea and sodium chloride (NaCl) were added to the reactor. The batch temperature was held at 45° C. for 10 minutes or until the mixture was completely dissolved.

The final $[F:(U_1+U_2)]$ mole ratio was about 1.15:1.00 and the resin synthesis was completed by cooling the batch to a room temperature. The pH was adjusted to 8.0±0.2 using TEA and 10% formic acid. Some of the second urea reacted with the free formaldehyde present in the reaction mixture to form monomeric hydroxymethylureas, normally leaving less than 0.1% free formaldehyde content in the resin.

The glycerin-modified UF resins were stable at room temperature for a period of three to four weeks. The glycerin levels were 4-8% based on total liquid UF resin. The control UF resin was also synthesized in the same method described above. The control resin had no glycerin and a lower target cook viscosity of "J". The control UF resin was also stable at the room temperature for a period of three to four weeks. Table 1 displays the formulation used to prepare the samples. Table 4 shows the physical properties of the samples.

TABLE 1

| | Resins | | |
| --- | --- | --- | --- |
| Component | UF control | UF1 | UF2 |
| UFC*[1] | 46.30 | 44.80 | 45.00 |
| Water | 10.93 | 10.21 | 8.20 |
| TEA*[2] | 0.04 | 0.04 | — |
| Glycerin | — | 3.40 | 5.10 |
| Urea | 11.57 | 11.20 | 11.25 |
| Urea | 25.16 | 24.35 | 24.45 |
| NaCl | 6.0 | 6.00 | 6.00 |
| Total | 100.00 | 100.00 | 100.00 |

Note*:
UFC*[1]: Urea-Formaldehyde Concentrate (60% urea and 25% formaldehyde),
TEA*[2]: Triethanolamine Example 2

Glycerin-modified MUF resins were synthesized using a three-stage cook technology. In the first stage, a 53% aqueous formaldehyde (F) solution, water, and glycerin were charged into a reactor and a pH was adjusted to 7.5-8.0 using TEA, with or without 10% formic acid. Then, melamine (M) and first urea ($U_1$) were added into the reactor and a batch temperature was raised to 90-95° C. The melamine and urea were simultaneously reacted with formaldehyde to form methylolureas and methylolmelamines through the methylolation (hydroxymethylation) reaction. The reactions were continued to form MF polymers between methylolmelamines and possibly MUF copolymers between methylolmelamines and methylolureas. The batch temperature was lowered to 80-85° C. when "an ice-phobe" was seen.

The ice-phobe is a point that the resin turns white when a couple of resin droplet is dropped into ice water. The ice-phobe test is usually used in MF resin manufacturing to see quickly how the resin is polymerized in an early phase of condensation.

The batch continued to condense until "130-150%" of water tolerance (WT) was reached. The water tolerance test is used to check an incipient point that the resin turns cloudy when water is added to resin at 25° C. (water/resin×100). The water tolerance test is also used in the MF resin manufacturing to check the progress of condensation. The [F:($U_1$+M)] mole ratios were used here around 3.1:1.0-3.3:1.0.

At the second stage, additional urea ($U_2$) was charged and the condensation went further until the WT of "100-110%" was reached. The [F:($U_1$+$U_2$+M)] mole ratio became around 2.0:1.0-2.4:1.0. At the third stage, final urea ($U_3$) and water were slowly added into the batch while keeping the temperature at 60° C.-70° C. The resin was cooled down to 25° C. after the completion of charging the final urea water. The pH was adjusted to 8.0±0.2 using TEA and 10% formic acid. The final [F:($U_1$+$U_2$+$U_3$+M)] mole ratio was around 0.65:1.00.

The control MUF resin was also synthesized as the same method described above. The control resin had no glycerin and a lower target water tolerance of "80-90%" at the second stage. The control MUF resin and the glycerin-modified MUF resins were stored at 4° C., 25° C., and 35° C. to check the storage stability. The control MUF resin was crystallized at 4° C. after 2 days while the glycerin-modified MUF resins were very stable at that temperature over a period of four weeks. The control MUF resin was turned cloudy at 25° C. after 15 days and showed some precipitation after 20 days. However, the glycerin-modified MUF resins were very clear at 25° C. until three weeks and showed some precipitation after four weeks. Table 2 shows the composition used to prepare these examples. Table 4 shows the physical properties of the samples.

TABLE 2

| | Resins | | |
| --- | --- | --- | --- |
| Component | MUF control | MUF1 | MUF2 |
| Formaldehyde*[1] | 34.02 | 31.61 | 26.77 |
| Water | 4.00 | 4.90 | 6.25 |
| TEA*[2] | 0.06 | 0.06 | 0.06 |
| Glycerin | — | 5.10 | 12.75 |
| Urea | 6.10 | 5.71 | 2.01 |
| Melamine | 10.00 | 10.00 | 15.00 |
| Urea | 6.31 | 5.48 | 4.36 |
| Water | 1.21 | 1.54 | 2.65 |
| Urea | 38.30 | 35.60 | 30.15 |
| Total | 100.00 | 100.00 | 100.00 |

Note*:
Formaldehyde*[1]: 53% concentration,
TEA*[2]: Triethanolamine

Example 3

Glycerin-modified MF resins were synthesized using a single-stage cook technology. Into a stirred reactor, a 53% aqueous formaldehyde (F) solution, water, and glycerin were charged and a pH was adjusted to 9.3-9.5 using 50% sodium hydroxide with or without 10% formic acid. Then, melamine (M) was added into the reactor and a batch temperature was raised to 95-101° C. The batch temperature was lowered to 90-95° C. when "an ice-phobe" was seen. The ice-phobe test was run the same way as in the Example 2.

The batch condensation was continued to "160-180%" of water tolerance. The water tolerance test was also run as the same way as in Example 2. The F:M mole ratio was about 1.7:1.0. The resin was cooled down to 25° C. while adjusting the pH to 9.3-9.5 using either 50% sodium hydroxide or 10% formic acid.

The control MF resin was synthesized similar to method described above except sugar and water were both added at the beginning and end of the cook. The control resin had no glycerin. Also, the control MF resin had a lower target water tolerance of "140-160". The control MF resin and the glycerin-modified MF resin were stored at 4° C., 25° C., and 35° C. to check the storage stability. The control MF resin turned cloudy and showed high viscosity at 4° C. after two weeks while the glycerin-modified MF resin were very clear without increasing viscosity at that temperature over a period of four weeks. The control MF resin and glycerin-modified MF resin were very stable at 25° C. and 35° C. over a period of three weeks. Table 3 shows the composition used to prepare these examples. Table 4 shows the physical properties of the samples.

TABLE 3

| Component | MF control | MF1 |
|---|---|---|
| Formaldehyde*[1] | 27.98 | 27.11 |
| Water | 23.82 | 24.56 |
| 25% NaOH | 0.08 | 0.08 |
| Sugar | 4.16 | — |
| Glycerin | — | 12.75 |
| Melamine | 36.61 | −35.50 |
| Water | 4.41 | — |
| Sugar | 2.94 | — |
| Total | 100.00 | 100.00 |

Note*:
Formaldehyde*[1]: 53% concentration

TABLE 4

| ID | M*[1] (%) | G*[2] (%) | NV*[3] (%) | WT*[4] (%) | Viscosity (G – H)*[5] | Final F:(U + M)*[6] | Cook F:(U + M)*[6] | pH |
|---|---|---|---|---|---|---|---|---|
| UF control | 0 | 0 | 70 | — | K | 1.15 | 2.4 | 8.0 |
| UF1 | 0 | 3 | 70 | — | N | 1.15 | 2.4 | 8.0 |
| UF2 | 0 | 5 | 72 | — | JK | 1.15 | 2.4 | 8.0 |
| MUF control | 10 | 0 | 67 | 100 | A | 0.65 | 3.3/2.1 | 8.0 |
| MUF1 | 10 | 5 | 67 | 125 | A | 0.65 | 3.2/2.1 | 8.0 |
| MUF2 | 15 | 13 | 67 | 125 | A | 0.65 | 3.1/2.1 | 8.0 |
| MF control | 37 | 0 | 57 | 150 | A1 | 1.7 | 1.7 | 9.3 |
| MF1 | 36 | 13 | 57 | 180 | A1 | 1.7 | 1.7 | 9.3 |

Note*:
M*[1]: Melamine,
G*[2]: Glycerin,
NV*[3]: Non-Volatile,
WT*[4]: Water Tolerance,
G – H*[5]: Gardner-Holt viscosity,
F:(U + M)*[6]: Formaldehyde:(Urea + Melamine) mole ratio

Example 4

Single-layer particleboards were prepared using the resins from Examples 1-3 and dried core-layer western softwoods furnishes. The particleboards were prepared at the conditions set forth in Table 5. The detail PB manufacturing procedures are as follows. The wood particles were blended with the resins using a high-speed blender. The blended particles were weighed and hand-felted onto a caul plate within a forming box to obtain homogeneous mats. The mat was pressed in a hot press to reach to the target thickness of 0.68 inch. The finished boards were cooled to room temperature and equilibrated to desired moisture content of 8%. The conditioned boards were trimmed to 12 inch by 12 inch, sanded, and cut for internal bond (IB), modulus of rupture (MOR) and modulus of elasticity (MOE) test samples. The sample sizes and testing for IB, MOR and MOE were according to the American Society for Testing and Materials (ASTM) Standard D 1037, Volume 4.09-Wood. Twelve IB specimens and two MOR and MOE samples per condition were tested with a United machine. The results are reported in Table 6.

TABLE 5

PARTICLEBOARD MANUFACTURING AND TESTING PARAMETERS

Particleboard manufacturing:

Furnish: western softwoods
Furnish MC: 3.7%
Mat moisture contents: 9-12.0%
Blending time: 45 sec
Catalyst: 1.0% ammonium sulfate (as 25% solution) based on Non-Volatile resin
Wax: 0.5% (as 50% solution) based on oven dry wood weight
Resin type: UF, MUF, and MF resins with/without scavenger resin
Resin contents: 6~11% based on oven dry wood weight

TABLE 5-continued

PARTICLEBOARD MANUFACTURING AND TESTING PARAMETERS

Mat dimensions: 14.625 inch × 14.625 inch × 0.68 inch
Target board density: 47 lb/ft³
Press temperature: 325° F.~345° F.
Press cycle: 220 and 250 sec
Testing:

Internal bond strength test: twelve 2" × 2" samples per condition
Bending test (MOR and MOE): two 2" × 12" samples per condition

TABLE 6

PARTICLEBOARD TESTING RESULTS

| Resin | NV* (%) | RT* (%) | Density (lb/ft³) | IB* (psi*) | MOR* (psi*) | F:(U + M)* | Glycerine (%) | Melamine (%) |
|---|---|---|---|---|---|---|---|---|
| UF control | 70 | 7.0 | 43.6 | 162 | 2163 | 1.15 | 0.00 | 0.00 |
|  |  |  | 42.9 | 136 | 1800 |  |  |  |

TABLE 6-continued

PARTICLEBOARD TESTING RESULTS

| | | | | | | Property | | |
|---|---|---|---|---|---|---|---|---|
| Resin | NV* (%) | RT* (%) | Density (lb/ft³) | IB* (psi*) | MOR* (psi*) | F:(U + M)* | Glycerine (%) | Melamine (%) |
| UF1 | 70 | 7.0 | 43.0 | 165 | 2072 | 1.15 | 3.40 | 0.0 |
| | | | 42.0 | 134 | 1859 | | | |
| UF2 | 72 | 7.0 | 42.2 | 136 | 1737 | 1.15 | 5.10 | 0.0 |
| | | | 45.4 | 173 | 2111 | | | |
| MUF control | 67 | 11.0 | 42.6 | 85 | 1328 | 0.55* | 0.00 | 10.0 |
| | | | 43.1 | 94 | 1234 | | | |
| MUF1 | 67 | 11.0 | 43.4 | 90 | 1348 | 0.55* | 8.50 | 10.0 |
| | | | 43.1 | 93 | 1399 | | | |
| MUF2 | 67 | 11.0 | 43.1 | 98 | 1470 | 0.55* | 12.75 | 15.0 |
| | | | 43.9 | 113 | 1436 | | | |
| MF control | 57 | 6.9 | 45.4 | 144 | 2573 | 1.03* | 0.00 | 36.7 |
| | | | 43.9 | 133 | 2321 | | | |
| MF1 | 57 | 6.9 | 46.3 | 156 | 4422 | 1.03* | 12.75 | 35.5 |
| | | | 45.4 | 141 | 3662 | | | |

Note*:
NV*: Non-Volatile,
RT*: Resin Treatment,
IB*: Internal Bond,
psi*: pound per square inch,
MOR*: Modulus Of Rupture,
F:(U + M)*: Formaldehyde:(Urea + Melamine) mole ratio
(*= combined mole ratios with scavenger resin)

Example 5

Medium density fiberboards (MDF) were prepared using the resins from Example 3 and dried western softwoods fibers. The medium density fiberboards were prepared at the conditions set forth in Table 7. The detail MDF manufacturing procedures are as follows. The wood fibers were blended with the resins using a blowline blender. The resinated fibers were weighed and air-felted onto a forming box to obtain homogeneous mats. The mat was pressed in a hot press to reach to the target thickness of 0.68 inch. The finished boards were cooled to room temperature and equilibrated to desired moisture content of 8%. The preparation of samples and the tests were same as Example 4. The results are reported in Table 8.

TABLE 7

MEDIUM-DENSITY FIBERBOARD MANUFACTURING AND TESTING PARAMETERS

Medium-density fiberboard manufacturing:

Furnish: western softwoods
Furnish MC: 8.8%

TABLE 7-continued

MEDIUM-DENSITY FIBERBOARD MANUFACTURING AND TESTING PARAMETERS

Mat moisture contents: 8-9%
Blending time: 20-25 min
Catalyst: 1% (as 25% solution) based on Non-Volatile resin
Wax: 0.5% (as 50% solution) based on oven dry wood weight
Resin type: MF resins with scavenger resin
Resin contents: 8% based on oven dry wood weight
Mat dimensions: 14.625 inch × 14.625 inch × 0.68 inch
Target board density: 47 lb/ft³
Press temperature: 325° F.
Press time: 220 and 250 sec
Testing:

Internal bond strength test: twelve 2" × 2" samples per press cycle
Bending test (MOR and MOE): two 2" × 12" samples per press cycle

TABLE 8

MDF TESTING RESULTS

| | | | | | | Property | | |
|---|---|---|---|---|---|---|---|---|
| Resin | NV* (%) | RT* (%) | Density (lb/ft³) | IB* (psi*) | MOR* (psi*) | F:(U + M)* | Glycerin (%) | Melamine (%) |
| MF control | 57 | 11.8 | 45.0 | 103 | 2958 | 1.03* | 0.00 | 36.6 |
| | | | 43.1 | 108 | 2634 | | | |
| MF1 | 57 | 11.8 | 44.8 | 126 | 3733 | 1.03* | 15.00 | 35.5 |
| | | | 44.8 | 143 | 3548 | | | |

Note*:
NV*: Non-Volatile,
RT*: Resin Treatment,
IB*: Internal Bond,
psi*: pound per square inch,
MOR*: Modulus Of Rupture,
F:(U + M)*: Formaldehyde:(Urea + Melamine) mole ratio
(*= combined mole ratios with scavenger resin)

DISCUSSION OF THE EXAMPLES

Medium Density Fiberboard and Particle Board were manufactured using the resins of the disclosure. The PB study results show that all glycerin-modified UF, MUF, and MF resins exhibited equal or better internal bond (IB) strength and modulus of rupture (MOR) strength than the control UF, MUF, and MF resins, in view of the density variations. The MDF study results also show that the glycerin-modified MF resin exhibited better internal bond (IB) strength and modulus of rupture (MOR) strength than the control MF resins, considering the density variations.

What is claimed is:

1. An amino-formaldehyde resin prepared using a formulation comprising, under condensation reaction conditions, formaldehyde, glycerin and at least one compound selected from the group consisting of urea, melamine, and mixtures thereof; wherein;
    the amino-formaldehyde resin is prepared in a substantial absence of a sulfonating agent, ethylene glycol, and polyalkylene glycols;
    if the at least one compound is urea, then the urea is present in a final molar ratio of formaldehyde to urea ranging from about 0.70 to about 1.30;
    if the at least one compound is melamine, then the melamine is present in a final molar ratio of formaldehyde to melamine ranging from about 1.3 to about 2.2; and
    if the at least one compound is a mixture of urea and melamine, then the mixture of urea and melamine is present in a final molar ratio of formaldehyde to urea and melamine ranging from about 0.35 to about 1.3; and wherein;
    the amino-formaldehyde resin has improved storage stability, as compared to a conventional resin which has the same final ratio of formaldehyde to amino compounds as the amino-formaldehyde resin but which does not use glycerin in the formulation; and
    the amino-formaldehyde resin comprises a glycerin modified amino-formaldehyde resin prepared by introducing the glycerin using a front end addition process.

2. The amino-formaldehyde resin of claim 1 wherein the resin is a UF resin and the urea is present in a final molar ratio of formaldehyde to urea ranging from about 0.70 to about 1.30.

3. The amino-formaldehyde resin of claim 2 wherein the resin is a UF resin and the urea is present in a final molar ratio of formaldehyde to urea of about 1.15.

4. The amino-formaldehyde resin of claim 2 wherein the resin is a UF resin and the glycerin is present at a concentration of about 6 weight percent of the formulation.

5. The amino-formaldehyde resin of claim 1 wherein the resin is a MF resin and the melamine is present in a final molar ratio of formaldehyde to melamine ranging from about 1.3 to about 2.2.

6. The amino-formaldehyde resin of claim 5 wherein the resin is a MF resin and the melamine is present in a final molar ratio of formaldehyde to melamine of about 1.7.

7. The amino-formaldehyde resin of claim 5 wherein the resin is a MF resin and the glycerin is present at a concentration of about 15 weight percent of the formulation.

8. The amino-formaldehyde resin of claim 1 wherein the resin is a MUF resin and the mixture of urea and melamine is present in a final molar ratio of formaldehyde to urea and melamine ranging from about 0.35 to about 1.3.

9. The amino-formaldehyde resin of claim 8 wherein the resin is a MUF resin and the mixture of urea and melamine is present in a final molar ratio of formaldehyde to urea and melamine of about 0.65.

10. The amino-formaldehyde resin of claim 8 wherein the resin is a MUF resin and the glycerin is present at a concentration of about 15 weight percent of the formulation.

11. The amino-formaldehyde resin of claim 1 wherein the amino-formaldehyde resin is a UF or a MUF resin and the UF or MUF resin is prepared using a formaldehyde urea concentrate.

12. The amino-formaldehyde resin of claim 1 wherein the amino-formaldehyde resin is a MF or a MUF resin and the MF or MUF resin is prepared using melamine having a particle size of from about 50 to 400 microns.

13. The amino-formaldehyde resin of claim 1 wherein the resin is a UF or a MUF resin and the UF or MUF resin is prepared using an urea having a purity of about 98 percent.

14. A process for preparing an amino-formaldehyde resin comprising combining under condensation reaction conditions formaldehyde, glycerin, and at least one compound selected from the group consisting of urea, melamine, and mixtures thereof; wherein;
    the amino-formaldehyde resin is prepared in a substantial absence of a sulfonating agent, ethylene glycol, and polyalkylene glycols;
    if the at least one compound is urea, then the urea is present in a final molar ratio of formaldehyde to urea ranging from about 0.70 to about 1.30;
    if the at least one compound is melamine, then the melamine is present in a final molar ratio of formaldehyde to melamine ranging from about 1.3 to about 2.2; and
    if the at least one compound is a mixture of urea and melamine, then the mixture of urea and melamine is present in a final molar ratio of formaldehyde to urea and melamine ranging from about 0.35 to about 1.3; and wherein;
    the amino-formaldehyde resin has improved storage stability, as compared to a conventional resin which has the same final ratio of formaldehyde to amino compounds as the amino-formaldehyde resin but which does not use glycerin in the formulation; and
    the amino-formaldehyde resin comprises a glycerin modified amino-formaldehyde resin prepared by introducing the glycerin using a front end addition process.

15. An article of manufacture comprising a substrate and an amino-formaldehyde resin wherein:
    the substrate is in a form selected from the group consisting of cellulosic:
        -particles, -strands, -fibers, -veneers, and mixtures thereof;
    the amino-formaldehyde resin functions to adhere the substrate together into or within the article of manufacture; and
    the amino-formaldehyde resin is prepared using the formulation of claim 1.

16. The article of manufacture of claim 15 wherein the article of manufacture is particle board.

* * * * *